(12) United States Patent
Jackson

(10) Patent No.: US 10,865,863 B2
(45) Date of Patent: Dec. 15, 2020

(54) POWER TAKE-OFF DRIVE GEAR THRUST LOAD CANCELING

(71) Applicant: Eaton Cummins Automated Transmission Technologies LLC, Galesburg, MI (US)

(72) Inventor: Graeme A. Jackson, Kalamazoo, MI (US)

(73) Assignee: Eaton Cummins Automated Transmission Technologies, LLC, Galesburg, MI (US)

( * ) Notice: Subject to any disclaimer, the term of this patent is extended or adjusted under 35 U.S.C. 154(b) by 25 days.

(21) Appl. No.: 16/319,088

(22) PCT Filed: Jul. 19, 2017

(86) PCT No.: PCT/US2017/042752
§ 371 (c)(1),
(2) Date: Jan. 18, 2019

(87) PCT Pub. No.: WO2018/017653
PCT Pub. Date: Jan. 25, 2018

(65) Prior Publication Data
US 2019/0383372 A1      Dec. 19, 2019

Related U.S. Application Data

(60) Provisional application No. 62/364,581, filed on Jul. 20, 2016.

(51) Int. Cl.
*F16H 37/04*      (2006.01)
*B60K 17/28*      (2006.01)
(Continued)

(52) U.S. Cl.
CPC .......... *F16H 37/046* (2013.01); *B60K 17/28* (2013.01); *F16H 3/097* (2013.01); *F16H 3/0915* (2013.01);
(Continued)

(58) Field of Classification Search
CPC ..... B60K 17/28; F16H 37/046; F16H 3/0915; F16H 3/097; F16H 2200/0069; F16H 2200/0078
See application file for complete search history.

(56) References Cited

U.S. PATENT DOCUMENTS

| 2,590,870 A | 4/1952 | Keese |
| 3,260,541 A * | 7/1966 | Sadler .................... A01B 71/06 403/325 |

(Continued)

FOREIGN PATENT DOCUMENTS

| DE | 102014202382 A1 | 8/2015 |
| EP | 2169266 A1 | 3/2010 |

OTHER PUBLICATIONS

International Search Report dated Sep. 27, 2017 cited in PCT/US2017/042752.
(Continued)

*Primary Examiner* — Tisha D Lewis
(74) *Attorney, Agent, or Firm* — Harness, Dickey & Pierce, P.L.C.

(57) ABSTRACT

A transmission includes a countershaft, an input shaft and a clutch that couples the input shaft to the countershaft, a main transmission assembly having a main shaft and a main transmission clutch, the main shaft coupled to the countershaft via the main transmission clutch, and a range gear assembly. The transmission includes a power take-off shaft coupled to an axial end of the countershaft and colinear therewith, wherein the power take-off shaft and the coun-
(Continued)

tershaft are rotationally coupled to one another and axially decoupled from one another.

10 Claims, 3 Drawing Sheets

(51) Int. Cl.
  *F16H 3/091* (2006.01)
  *F16H 3/097* (2006.01)
(52) U.S. Cl.
  CPC ............... *F16H 2200/0069* (2013.01); *F16H 2200/0078* (2013.01)

(56) References Cited

U.S. PATENT DOCUMENTS

| | | | |
|---|---|---|---|
| 4,074,581 A * | 2/1978 | Stevens | F16H 3/085 475/207 |
| 4,215,586 A * | 8/1980 | Morris, Sr. | F16H 3/085 74/15.2 |
| 4,294,130 A | 10/1981 | Kisaka et al. | |
| 5,492,034 A | 2/1996 | Bogema | |
| 5,779,385 A * | 7/1998 | Fechter | F16D 1/116 403/325 |
| 6,080,081 A | 6/2000 | Sauermann et al. | |
| 9,239,106 B2 * | 1/2016 | Schneider | B60K 17/28 |
| 10,259,462 B2 * | 4/2019 | Mair | B60W 10/18 |
| 2006/0116238 A1 * | 6/2006 | Karlsson | B60W 30/19 477/109 |
| 2006/0241840 A1 * | 10/2006 | Steen | B60W 10/10 701/51 |
| 2007/0288150 A1 * | 12/2007 | Schnitzer | B60W 30/19 701/51 |
| 2011/0061493 A1 | 3/2011 | Bartling et al. | |
| 2013/0005525 A1 | 1/2013 | Hedman et al. | |
| 2015/0267778 A1 | 9/2015 | Peterson et al. | |

OTHER PUBLICATIONS

Extended European Search Report dated Feb. 21, 2020 (corresponding to EP 17831748.3).

* cited by examiner ized shifting. A transmission may include

POWER TAKE-OFF DRIVE GEAR THRUST LOAD CANCELING

CROSS-REFERENCE TO RELATED APPLICATION

This application claims priority to International Patent Application No. PCT/US2017/042752, filed Jul. 19, 2017, which claims priority to U.S. Provisional Patent Application Ser. 62/364,581, filed Jul. 20, 2016, both of which are hereby incorporated by reference in their entirety.

TECHNICAL FIELD

The present disclosure relates to heavy duty transmission architecture for vehicles and more specifically to a transmission architecture that is configured to improve a thrust load capability of a power take off shaft.

BACKGROUND

Manual transmissions are used for various vehicle applications. Such transmissions typically include a multiple speed main section containing a plurality of gears for various range and load gearing configurations. Traditionally, a clutch provides momentary torque interrupt when gear ratio changes occur. The clutch is used to engage the transmission from a driving shaft powered by an engine.

Systems have been developed to improve the shifting process, such as automated manual transmissions (AMTs) and dual clutch transmissions (DCTs). An AMT includes a clutch, a gearbox, and an embedded dedicated control system that uses electronic sensors, processors, and actuators to actuate gear shifts upon receipt of a throttle pedal command such as from an input applied to a throttle pedal by a driver. An AMT removes the need for a clutch pedal while the driver is still able to control vehicle movement. The clutch itself is actuated by electronic equipment that can synchronize the timing and the torque to make gear shifts quick and smooth.

Dual clutch transmissions (DCTs) have been developed that enable shifting between sets of gears without torque interrupt. In a dual clutch, an inner shaft and an outer shaft may have two or more connectable gears (via sliding clutches or sliding clutches and synchronizers) that drive their respective downstream layshaft members for appropriate speed ratios. The clutches can be alternately engaged as the gear progression is achieved between, for example, four sequential gears to permit power shifting between four progressive ratios.

A transmission such as a manual transmission, automated manual transmission, or dual clutch transmission may include a countershaft to provide gear reduction between portions of the transmission. Typically, the countershaft does not carry heavy thrust loads and thus may be supported by relatively efficient cylindrical roller bearings.

In some transmission designs a power take-off shaft is coupled to a countershaft of the transmission. The power take-off shaft provides a shaft from which power may be drawn for running mechanical equipment, such as a generator or a pump, off of the vehicle's engine. The power take-off shaft, however, may introduce a substantial thrust load due to its gearing, and the thrust may be transmitted to the countershaft, which can lead to early life failure of the transmission. Moreover, the power take-off shaft is not typically used for a large portion of the overall life of the engine. Thus, during the overall life of the engine only a fraction of its total runtime may be used for providing power to a power take-off shaft.

Nevertheless, due to the significant thrust loads introduced during use of the power take-off shaft, its support bearings are typically designed so that the transmission does not experience early life failure due to the use of the power take-off shaft. As such, transmissions with a power take-off shaft typically include a thrust bearing such as a taper roller bearing. Thrust bearings, however, are less efficient than cylindrical roller bearings, and thus overall efficiency of the transmission may be reduced in transmissions that include a power take-off shaft.

Thus, there is a need to improve the thrust-bearing capabilities of transmissions with a power take-off shaft, without compromising overall efficiency of the transmission.

BRIEF DESCRIPTION OF THE DRAWINGS

Referring now to the drawings, illustrative examples are shown in detail. Although the drawings represent the exemplary illustrations described herein, the drawings are not necessarily to scale and certain features may be exaggerated to better illustrate and explain an innovative aspect of an exemplary illustration. Further, the exemplary illustrations described herein are not intended to be exhaustive or otherwise limiting or restricting to the precise form and configuration shown in the drawings and disclosed in the following detailed description. Exemplary illustrations of the present disclosure are described in detail by referring to the drawings as follows.

DETAILED DESCRIPTION

An exemplary transmission architecture may be configured to have mechanisms and associated functions of an automated manual transmission (AMT), so as to provide model flexibility for application variances. AMT devices may be activated using electro-pneumatic, electro-hydraulic, and electro-mechanical devices. An AMT removes the need for a clutch pedal while a vehicle operator is still able to control vehicle movement.

In a typical AMT control scheme, a constant engine speed is requested during engagement so as to equalize engine and clutch torques as much as practical using such a scheme. Clutch control may provide a clutch torque reference, and through a suitable model, the torque reference is converted into a position reference for the clutch actuator position control. AMT designs provide model flexibility for application variances. AMT ratio change steps are designed to be somewhat small and fast, so as to be generally unnoticeable to a vehicle operator whose driving experience is similar to that associated with a power shifted device. The transmission may be further configured to provide even smaller steps when AMT ratio changes are encountered. These very small steps minimize perceived shift delay (such as a few milliseconds) or AMT engine speed droop. The transmission can also be configured to use small actuation energy, a small passage of time to accomplish the shifting, or both energy/ time to accomplish the AMT ratio changes and improve the operating efficiency in high range (driving speeds) ratios.

Exemplary transmissions may have a direct drive configuration, overdrive configuration, or double overdrive configuration. For example, such transmissions may have a gearbox including a 5×2 configuration (10 gear combinations), 4×2×2 configuration (16 gear combinations), a 3×3×2 configuration (18 gear combinations), a 5×2×2 (20 gear combinations) configuration or other suitable configurations as desired. Overdrive is commonly known as a gear or gear combination in a motor vehicle that provides a gear ratio that is higher than that of a drive or input shaft, so that engine speed and fuel consumption are reduced. Thus, a single overdrive transmission design includes one gear combination that is higher than that of the input shaft, and a dual overdrive transmission includes two gear combinations that are higher than that of the input shaft. Exemplary single and double overdrive designs are discussed below.

An advantage of the exemplary transmission architecture is a robust design for application variances. In particular, the exemplary transmission may have a housing configured to contain therein any single type of a family of transmissions. Examples include the DCT and the AMT. However, the housing can be configured to enclose other suitable transmissions.

Figure 1:
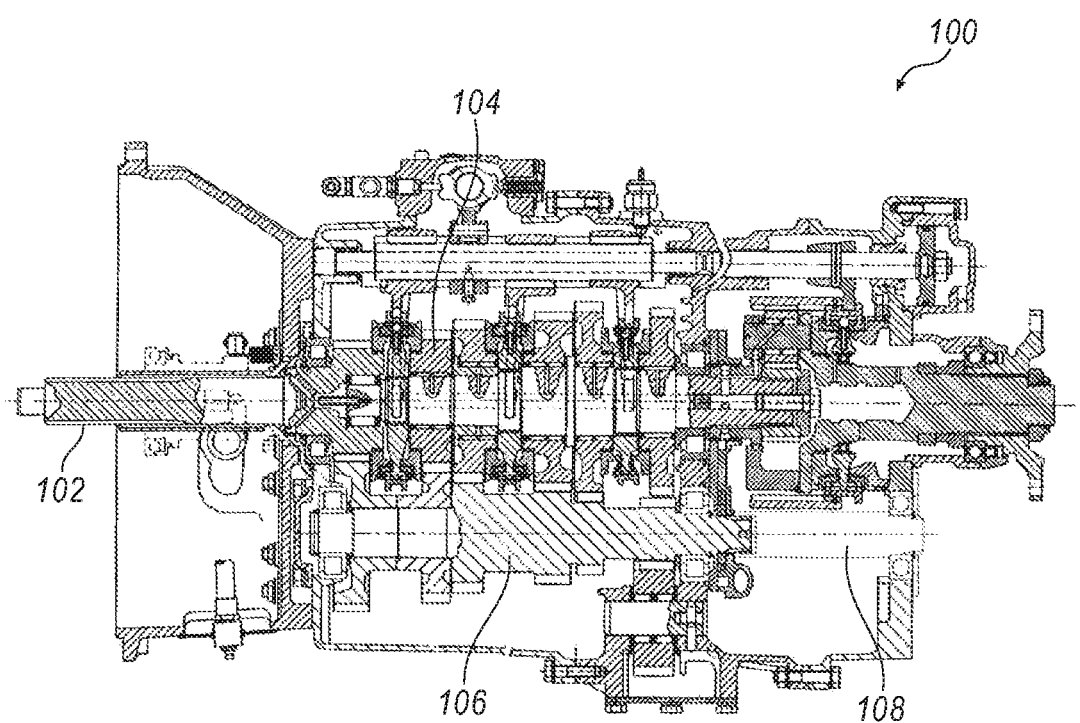
FIG. 1 illustrates a 5×2 single countershaft transmission configuration according to one exemplary aspect of the present teachings.

FIG. 1 illustrates an exemplary 5×2 configuration 100. The 5×2 configuration 100 includes a front input shaft 102 with the ability to couple to a coaxial front drive gear or uncouple in a neutral state, and a rear input shaft 104 with the ability to couple to a countershaft 106 through coaxial gears. Front input shaft 102 transfers torsional power to rear input shaft 104, with power transferred through countershaft 106. The 5×2 configuration 100 may include a single countershaft 106, or a dual countershaft design in which both countershafts provide coupling between front input shaft 102 and rear input shaft 104. Configuration 100 includes a power take-off shaft 108 that is axially coupled to countershaft 106.

Figure 2:
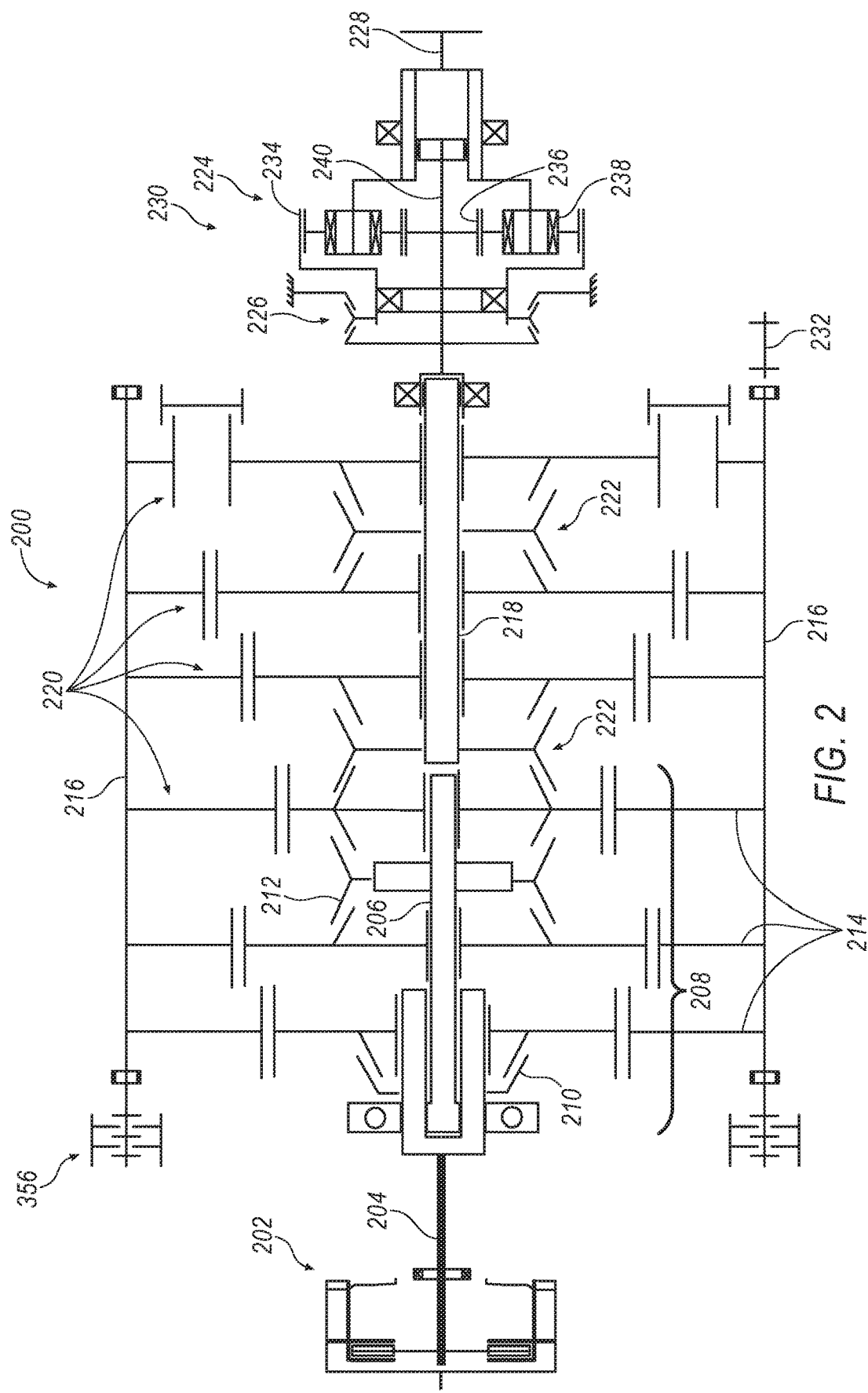
FIG. 2 is a schematic representation of an exemplary 3×3×2 twin countershaft transmission.

FIG. 2 is a schematic configuration or representation 200 of an exemplary 3×3×2 transmission, that is attractive due to its 18 ratios with smaller ratio step size and larger overall ratio coverage as compared to a 12 speed 2×3×2 base. Typically, a 12 speed 2×3×2 design includes a two splitter input shaft section. The illustrated 3×3×2 configuration 200, on the other hand, includes a three splitter input shaft section. Transmission 200 having a main transmission clutch 202 for operating an input that includes a front input shaft 204 and a rear input shaft 206. A splitter section 208 is operable via clutch 202, and splitter section 208 includes a forward clutch 210 and a rearward clutch 212. Forward and rearward clutches 210, 212 are coupled together and configured to selectively engage gears 214.

Configuration 200 includes countershafts 216 and is thereby illustrated as a dual countershaft arrangement. However, although a dual countershaft is illustrated, it is contemplated that configuration 200 may also include a single countershaft 216. Clutches 210, 212 are operable to engage, or not, by their respective clutch mechanisms.

Configuration 200 includes a main shaft 218 that is coupled to countershafts 216 via pairs of gears 220, and is operable as an AMT. Main shaft 218 includes clutches 222 which, through selective forward or rearward motion, engage countershaft 216 with main shaft 218. Selective engagement of the main shaft clutches 222 enables implementation of various forward gear ratio combinations and a reverse capability. Thus, depending on which gear in splitter section 208 is engaged, and which gear along main shaft 218 is engaged, various gear ratios may be implemented. In addition, configuration 200 includes in the illustrated example a range gearbox 224. In operation of range gearbox 224, a range clutch 226 may be positioned to cause a rear output shaft 228 to rotate through a counter rotation of planetary gear 230. In one example, the range gearbox is a range gear assembly that includes an annulus gear 234, a sun gear 236, a planet gear 238, and a center shaft 240 that provides output from the transmission.

Configuration 200 includes a power take-off shaft 232 that is axially coupled to a countershaft 216. Power take-off shaft 232 extends outside of an engine casing (not shown) that provides a rotational input to auxiliary power devices such as generators, pumps, and the like. As such, power take-off shaft 232 provides a convenient power source for operation where auxiliary power devices may be employed, without the need to transport a separate power system to power the auxiliary devices. For instance, in remote locations and/or construction sites, power from an electrical grid may not be readily available. Thus, the auxiliary devices may be coupled directly to power take-off shaft 232 while a truck (not shown) in which configuration 200 is positioned is maintained in a stationary position. That is, configuration 200 is placed in a neutral position by having clutches 222 disengaged, and having one of forward and rearward clutches 210, 212 engaged. In such fashion, front and rear input shafts 204/206 are caused to engage countershaft 216 such that countershaft 216 is caused to rotate, while avoiding power transfer to planetary gear 230 and ultimately rear output shaft 228. Power is thereby transferred to power take-off shaft 232 while the truck remains stationary, and auxiliary devices may thereby be coupled to power take-off shaft 232 and powered through configuration 200.

Figure 3:
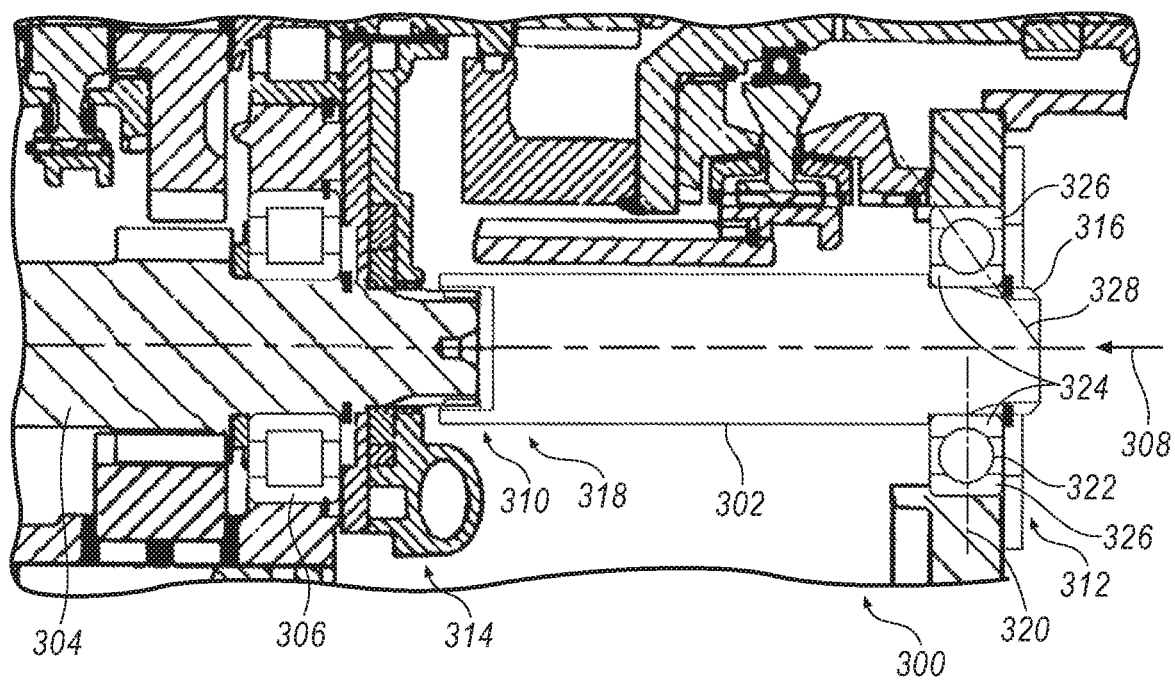
FIG. 3 is an illustration of a power take-off assembly.

Referring now to FIG. 3, a power take-off assembly 300 is illustrated. Power take-off assembly 300 may be implemented in transmissions such as those described above and for example in configuration 100 of FIG. 1 or configuration 200 of FIG. 2.

Power take-off assembly 300 includes a power take-off shaft 302 that is coupled to a countershaft 304 which, in one example, corresponds respectively with countershafts 106 or 216 of configuration 100 of FIG. 1 and configuration 200 of FIG. 2. Countershaft 304 is supported by a cylindrical roller bearing 306 which, as described, are mechanically efficient but typically do not support thrust loads. However, when an auxiliary device is connected to power take-off shaft 302 an axial load 308 may be imparted thereto. Accordingly, power take-off assembly 300 includes a thrust canceling spline 310 that transfers a rotational load but allows for slight axial displacement between countershaft 304 and power take-off shaft 302. Power take-off assembly 300 includes a ball bearing 312 and as such, power take-off shaft is supported by spline 310 and ball bearing 312. That is, ball bearing 312 works with both radial and thrust loads. In one example, ball bearing 312 is a single row bearing at an axial location along power take-off shaft 302. However, in another example, ball bearing 312 may be a double-row bearing in which first and second rows are positioned side-by-side axially, allowing for additional radially loads be carried, compared to a single row design, while providing thrust load capability. In either design, the balls are positioned against races or raceways that carry both the radial loads and the thrust loads. The raceways, as known in the art, are curved about the balls and having a curvature that is generally larger than a curvature of the balls. In such fashion, the balls contact the raceways over contact areas between the balls and raceways, and such contact locations may adjust or change in the axial direction due to the type of loading of the bearing.

For instance, for largely radial loads, the contact areas may be generally along a central plane of an inner raceway on which the balls pass during operation, and the contact may be along the same plane on the outer raceway as well. However, for increasing thrust loads, the bearings slide up the raceways such that the contact angle between the inner raceway, the outer raceway, and the balls is at an angle (thereby providing an ability of the ball bearing to carry both thrust loads and radial loads). For instance, referring still to FIG. 3, ball bearing 312 includes a generally planar loading direction 320 that illustrates a direction of loading between a ball 322, and inner race 324, and an outer race 326 for when there is little or no axial or thrust load.

However, in the event of an axial or thrust load in the direction shown as element 308, the load direction shifts accordingly and is illustrated in the upper portion of the cutaway of FIG. 3. That is, axial load 308 may cause an angled direction of contact 328 between inner race 324 and outer race 326, thus enabling both radial and axial loads to be carried by ball bearing 312.

Operation of power take-off assembly 300 is described for two modes of operation. The first mode is when power take-off shaft 302 carries no load and the transmission to which it is coupled provides transportation power to a truck. Referring for example to configuration 200, in the first mode of operation one of clutches 222 is engaged (as are the other clutches 210 and 212) and power is transferred to planetary gear 230 and ultimately to rear output shaft 228 to provide power to a wheel mechanism having tires that engage the ground. In this first mode of operation, no load is placed on power take-off shaft 302, and power take-off shaft 302 is thereby free to rotate in ball bearing 312. Because no load is on power take-off shaft 302, rotation within ball bearing 312 is very efficient and little frictional losses occur therein. Because the frictional losses are minimal, ball bearing 312 experiences little aging effects from its simple and free rotation of the unloaded power take-off shaft 302. Rotational forces are applied from countershaft 304 to power take-off shaft 302 through spline 310 but, because no load is applied to power take-off shaft 302, power take-off shaft 302 also is free to move in slight axial directions as well.

In a second mode of operation, power take-off shaft 302 is caused to carry load by having an auxiliary power device coupled thereto. In this mode of operation, referring again for example to configuration 200, clutches 222 are disengaged so that power is not transmitted to planetary gear 230 and thus not to rear output shaft 228. Power take-off shaft 302 thereby experiences not only rotational loads, but thrust loads as well. However, axial thrust load is not transferred to countershaft 304 because spline 310 allows for slight axial displacement between power take-off shaft 302 and countershaft 304, and because ball bearing 312 instead carries the thrust load.

In such fashion, overall life of the transmission is improved without a loss in system efficiency. That is, bearing 306 is therefore the more efficient cylindrical roller bearing 306 (compared to a less efficient taper roller bearing) since cylindrical roller bearing 306 does not carry the thrust load from the power take-off shaft 302, and bearing 312 is thereby a thrust-capable bearing that operates with little frictional losses during normal transportation operation of the truck.

As such, during transportation operation (power to the output shaft) the more efficient cylindrical roller bearing 306 efficiently carries a radial load. And, during stationary operation when power take-off shaft 302 experiences load, then bearing 312 carries the thrust load and cylindrical roller bearing 306 is isolated from thrust load.

Figure 4:
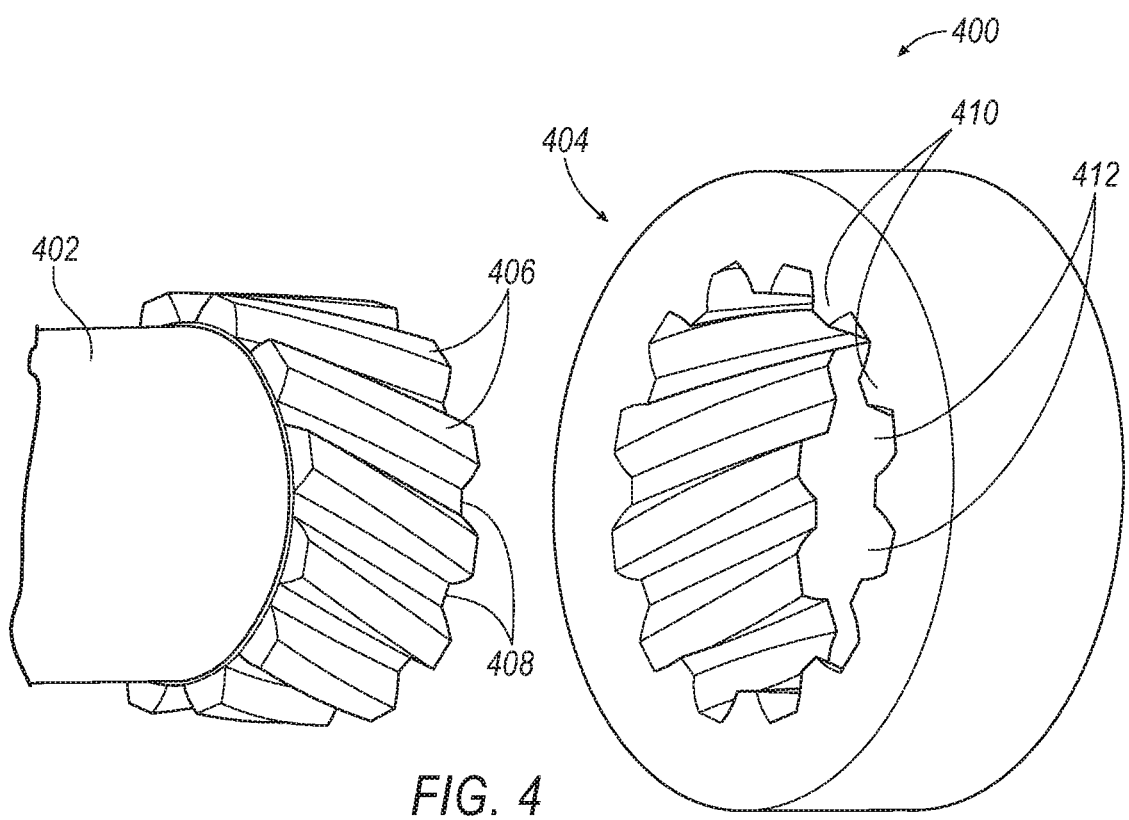
FIG. 4 is an illustration of a spline joint.

Spline joint 310 may be a helical spline joint or other geometry formed to transform the torque into an axial load, such as a ball spline or ball screw known in the art. FIG. 4 illustrates an exemplary spline joint 400, which may be utilized as, for instance, spline joint 310. Spline joint 400 includes an inner shaft 402 that is positionable within a bore 404. Shaft 402 includes circumferentially positioned helical ribs 406 and grooves 408. Bore 404 includes ribs 410 and grooves 412. Shaft 402 may be positioned axially therein, while avoiding interference. However, ribs and grooves 406, 408 and ribs and grooves 410, 412 are designed such that a circumferential interference is formed and a torque may be transferred between shaft 402 and bore 404, while allowing a slight amount of mechanical "play" in the radial direction.

Because of the axial fit between components, axial interference is avoided while allowing for proper torque transfer between components, which reduces wear in the bearings, thereby limiting eccentric loads and allowing axial forces to balance. In the example illustrated, ribs 406, 408 and grooves 410, 412 are approximately uniformly angularly positioned about a circumference of each of shaft 402 and bore 404 and illustrated with a common axial extent. However, it is contemplated that mating grooves and ridges may be positioned in non-uniform arrangements, as well, which in one example may enable a unique angular position or positions of each with respect to the other. That is, having a uniform spacing may enable spaces and grooves to be aligned in any of a number of discrete angles between components, while have non-uniform arrangements the parts may match for axial positioning at only a discrete set of positions. In addition, in one example the component parts that include the spline joint may be arranged having the ribs on one shaft (i.e., on countershaft 304) and the grooves on the other shaft (i.e., power take-off shaft 302). However, it is contemplated that the arrangement may be reversed and the ribs 406, 408 of the spline joint may be positioned, in this example, on power take-off shaft 302, and the grooves 410, 412 may be placed on main countershaft 304.

In another example, ribs 406, 408 and grooves 410, 412 may be helical in design, having a helical orientation along the axial direction of the shaft 408 and bore 404.

Thus, power take-off shaft 302 is coupled to an axial end 314 of countershaft 304 and colinear therewith. The power take-off shaft 302 and the countershaft 304 are rotationally coupled to one another and axially decoupled from one another via spline joint 310. That is, the power take-off shaft 302 and the countershaft 302 are rotationally coupled to one another and axially decoupled from one another through the spline joint 310. Cylindrical roller bearing 306 is coupled to countershaft 304, and the end 314 of the countershaft 304 that is proximate the spline 310 is radially supported by the cylindrical roller bearing 306. Thrust bearing in the form of ball bearing 312 is coupled to the power take-off shaft 302, and the bearing is positioned at an end 316 of the power take-off shaft 302 that is opposite an end 318 of the power take-off shaft 302 where the spline joint 310 is positioned.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain aspects of the present teachings, and should in no way be construed so as to limit the claimed disclosure.

Accordingly, it is to be understood that the above description is intended to be illustrative and not restrictive. Many aspects and applications other than the examples provided would be apparent upon reading the above description. The scope of the disclosure should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future aspects of the present teachings. In sum, it should be understood that the disclosed aspects of the present teachings are capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

Reference in the specification to "one example," "an example," "one approach," or "an application" means that a particular feature, structure, or characteristic described in connection with the example is included in at least one example. The phrase "in one example" in various places in the specification does not necessarily refer to the same example each time it appears.

What is claimed is:

1. A transmission, comprising:
   a countershaft;
   an input shaft and a clutch that couples the input shaft to the countershaft;
   a main transmission assembly having a main shaft and a main transmission clutch, the main shaft coupled to the countershaft via the main transmission clutch;
   a range gear assembly; and
   a power take-off shaft coupled to an axial end of the countershaft and co-linear therewith, wherein the power take-off shaft and the countershaft are rotationally coupled to one another and axially decoupled from one another by a spline joint, further comprising a thrust bearing coupled to the power take-off shaft, the thrust bearing positioned at an end of the power take-off shaft that is opposite an end of the power take-off shaft where the spline joint is positioned.

2. The transmission of claim 1, wherein the thrust bearing is a ball bearing.

3. A transmission, comprising:
   two countershafts;
   an input shaft and a clutch that couples the input shaft to the two countershafts;
   a main transmission assembly having a main shaft and a main shaft clutch, the main shaft coupled to the two countershafts via the main shaft clutch;
   a range gear assembly; and
   a power take-off shaft coupled to an axial end of one of the two countershafts and co-linear therewith, wherein the power take-off shaft and the one countershaft are rotationally coupled to one another and axially decoupled from one another by a spline joint, further comprising a thrust bearing coupled to the power take-off shaft, the thrust bearing positioned at an end of the power take-off shaft that is opposite an end of the power take-off shaft where the spline joint is positioned.

4. The transmission of claim 3, further comprising a cylindrical ball bearing coupled to the one countershaft, wherein an end of the countershaft that is proximate the spline is radially supported by the cylindrical ball bearing.

5. The transmission of claim 3, wherein the thrust bearing is a ball bearing.

6. The transmission of claim 3, wherein the range gear assembly includes an annulus gear, a sun gear, a planet gear, and a center shaft that provides output from the transmission.

7. The transmission of claim 3, further comprising:
   a front input shaft coupled directly to a main transmission clutch and having a first clutch coupled to the countershaft; and
   a rear input shaft coupled to the front input shaft and having a second clutch coupled to the countershaft.

8. A transmission, comprising:
   a main transmission assembly having a main shaft and a main shaft clutch, the main shaft coupled to a countershaft via a main shaft clutch;
   a planetary gear assembly having a center shaft that provides output from the transmission, the planetary gear assembly further including an annulus gear, a sun gear, and a planet gear; and
   a power take-off shaft coupled to an axial end of the countershaft and co-linear therewith, wherein the power take-off shaft and the countershaft are rotationally coupled to one another and axially decoupled from one another, further comprising a thrust bearing coupled to the power take-off shaft, the thrust bearing positioned at an end of the power take-off shaft that is opposite an end of the power take-off shaft where a spline joint connects the power take-off shaft to the countershaft.

9. The transmission of claim 8, further comprising a cylindrical ball bearing coupled to the countershaft, wherein an end of the countershaft that is proximate the spline is radially supported by the cylindrical ball bearing.

10. The transmission of claim 8, wherein the thrust bearing is a ball bearing.

* * * * *